United States Patent [19]
Hughel et al.

[11] 3,933,524
[45] Jan. 20, 1976

[54] ANTIMONY PLATING OF LEAD-ACID STORAGE BATTERIES GRIDS

[75] Inventors: Thomas J. Hughel, Royal Oak; Richard H. Hammar, Utica, both of Mich.

[73] Assignee: General Motors Corporation, Detroit, Mich.

[22] Filed: Apr. 5, 1974

[21] Appl. No.: 458,066

Related U.S. Application Data

[63] Continuation of Ser. No. 256,508, May 24, 1972, abandoned.

[52] U.S. Cl. .................................. 136/64; 136/65
[51] Int. Cl.² ........................................ H01M 35/08
[58] Field of Search ............. 136/64, 65, 19, 26–27, 136/36; 75/166 B

[56] References Cited
UNITED STATES PATENTS
3,723,182  3/1973  Venuto ............................. 136/26

OTHER PUBLICATIONS

Ilzro Project No. LE–84, Evaluation of Battery Paste Reactions, Progress Report No. 5, Eagle–Picher Industries, Inc.

Primary Examiner—Anthony Skapars
Attorney, Agent, or Firm—Lawrence B. Plant

[57] ABSTRACT

A method of making a lead-acid storage battery including the step of depositing antimony on the surface of a substantially non-antimonial lead grid used for positive plates. The antimony film/deposit extends the cycle life of non-antimonial grids by maintaining paste-to-grid adhesion without (1) significantly degrading battery initial performance, (2) substantially decreasing the hydrogen overvoltage which leads to gassing, and (3) substantially increasing the battery's tendency toward self-discharge.

2 Claims, 4 Drawing Figures

3,933,524

ANTIMONY PLATING OF LEAD-ACID STORAGE BATTERIES GRIDS

This is a continuation, of application Ser. No. 256,508, filed May 24, 1972, now abandoned.

BACKGROUND OF THE INVENTION

Lead-acid storage batteries have traditionally been manufactured by pasting lead alloy grids with battery makers lead oxide and then forming the positive and negative plates. The term "lead oxide" is used herein to include those oxides which are used by, and/or are familiar to, battery manufacturers, and usually include mixtures of lead oxides, typically the red and yellow oxides, with as much as 30% free lead. These oxides are mixed with other art-known ingredients such as expanders, bulkers, fibers, etc., to formulate particular pastes as is well known to those skilled in the art. Until recently, the grids have traditionally been cast from lead-antimony alloys, containing anywhere from about 4% to 12% antimony. The antimony in the cast grids makes the alloy more readily castable into sharp, thin sections and imparts mechanical strength to grids. Unfortunately, such antimony concentrations have a detrimental effect on battery performance to the extent that during cycling, the antimony corrodes away from the positive grids and deposits on the negative plates, where it lowers the hydrogen overvoltage and promotes gassing due to the electrochemical decomposition of the water in the electrolyte. Moreover, such amounts of antimony contribute to the tendency of the battery toward self-discharge. As a result, the industry has preferred to use the lower antimony content alloys and has long sought nonantimonial lead alloys as replacements for the antimonial lead. Included among such possible replacements are commercially pure lead, dispersion-strengthened lead, lead-calcium, lead-arsenic, lead-tellurium, lead-tin, lead-cadmium, lead-lithium and others. For purposes of this application, the term substantially nonantimonial lead is intended to include pure lead and those lead alloys which are so low (i.e., less than 0.5%) in antimony as not to be detrimental to the battery's performance. Of these non-antimonial alloys, lead-calcium alloys containing about 0.06% to about 0.09% by weight calcium are preferred.

While the non-antimonial lead alloy grids have substantially eliminated gassing and reduced self-discharge tendencies, positive plates made therefrom are short-lived when subjected to deep discharge cycling. In this regard, and by way of comparison, conventional cast lead-antimony positive grids will normally withstand 200 to 300 SAE deep cycles (SAE J537b), whereas the non-antimonials, i.e. lead-calcium, tend to fail after less than 80 cycles. The mode of failure of these plates lies principally in separation of the positive active material from the non-antimonial grid due to a loss of adhesion between the grid and the active materials. Loss of adhesion due to deep discharging is particularly undesirable in batteries used for golf carts, lift trucks, electric vehicles, etc., which all undergo deeper cycling than batteries used in automobiles equipped with alternators.

DESCRIPTION OF THE INVENTION

Accordingly, it is an object of this invention to increase the cycle life of batteries using substantially nonantimonial grid alloys by enhancing adhesion between the grid and positive paste without substantially lowering the battery's hydrogen overvoltage, increasing its tendency toward self-discharge, and/or lowering its initial rate performance. This and other objects of this invention will become more readily apparent from the following description which is made in conjunction with the appended drawings in which.

Figure 1:
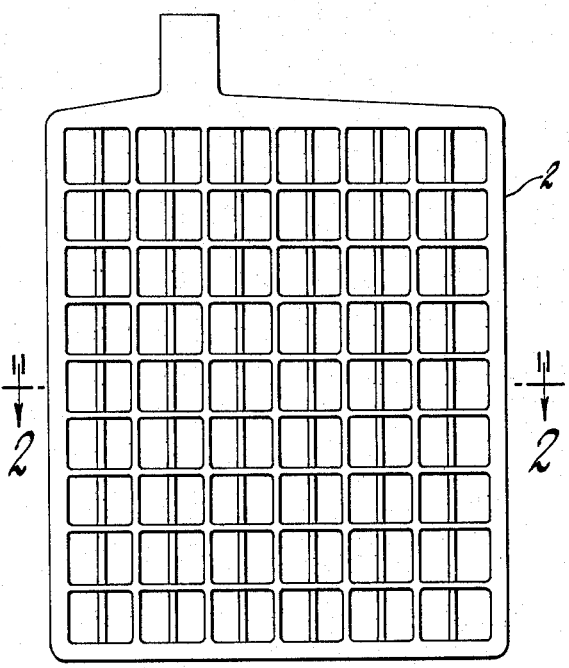
FIG. 1 is a view of a coated, typical, cast lead-acid storage battery grid.
Figure 2:
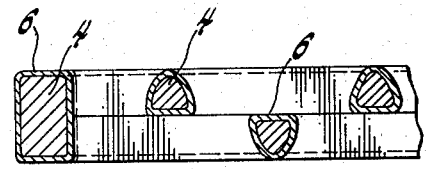
FIG. 2 is a magnified sectional view of the grid in FIG. 1 taken along the lines 2—2.
Figure 4:
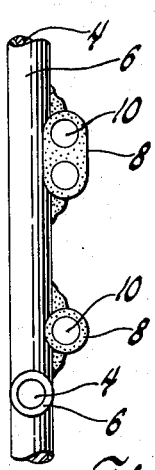
FIG. 4 is an enlarged side elevational view of the grid shown in FIG. 3 taken along the lines 4—4.
Figure 3:
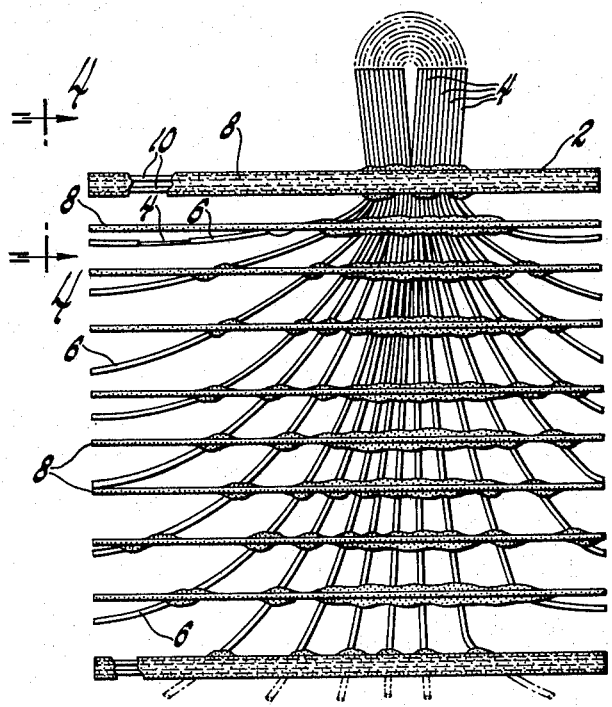
FIG. 3 is a view of a coated, woven, lead-plastic composite storage battery grid.

This invention comprehends coating the substantially non-antimonial lead 4 used in the positive grids 2 (FIGS. 1–3) with a very thin layer 6 of antimony. The layer 6 may be deposited in a number of ways including electroplating, spraying, vapor deposition, sputtering and chemical displacement. The antimony deposited on the surface of positive non-antimonial lead grids somehow influences the nature of the oxide layer formed on the surface of the grid wires during the formation process in a manner which promotes adhesion of the active materials to the grid. We have discovered that one need only have a very light, i.e., less than 0.00132 grams per square centimeter ($g/cm^2$) of antimony deposit to obtain this result and that these very light deposits do not seem to bring any of the aforesaid disadvantages of antimony into play. In contrast to this, it has been observed that non-antimonial lead-calcium (0.08%) grids having antimony deposits in excess of about 0.00232 $g/cm^2$ have a detrimental effect on batteries made therefrom. At this level, the 30 sec., 300 amp SAE cranking performance (initial rate) at both 80°F and 0°F, is reduced and the test cells showed signs of deterioration with continued testing to the extent that the second 300 amp-0° F high rate voltage test on the same cell was substantially less than the first such test. Other tests indicate that at deposits in excess of about 0.00232 $g/cm^2$ there is a substantial reduction in the cell voltage of a fully charged cell which is still being charged. In this regard, cell voltages at the end of the charge cycle in the six hour SAE cycle test were plotted as a function of the amount of plated antimony and the resulting curve fell off sharply from above 2.7 volts at a deposit of 0.00232 $g/cm^2$ to 2.5 volts at a deposit of about 0.00529 $g/cm^2$. One reason for the poor performance of the grids with the heavier deposits is that after formation, the heavier antimony deposits from an insulating double layer of reaction products over the grid. In this regard, an unconverted portion of the antimony deposit remains on the grid, a next layer of antimony oxide forms over the antimony layer and a final layer of lead sulfate forms over the antimony oxide. The conductivity of lead sulfate is very low and most of the antimony oxides are insulators — hence increased IR drop. After repeated cycling, the unreacted antimony will eventually dissipate into the positive paste and unto the negative plate thereby eliminating the insulating film problem but creating the aforesaid gassing problem and increasing the tendency of the battery to self-discharge. Lastly, one observer's work on dispersion strengthened lead coated with about 0.00232 $g/cm^2$ of antimony showed no consistent improvement in active material retention, but rather that the samples thusly prepared performed more like unplated non-antimonial grids. On the other hand, we have found that with antimony deposits significantly less than 0.00232 g/cm², we can increase the cycle life of the non-antimonial grids threefold without incurring reduced initial performance, significantly lowered hydrogen overvoltage or appreciable self-discharging tendencies attributable to the presence of antimony. To obtain the aforesaid life improvement without the aforesaid disadvantages, one need not coat the non-antimonial grids with any more than 0.00132 g/cm² of antimony with excellent results being obtainable at about 0.00053 g/cm² - 0.0006 g/cm². While even very small antimony deposits will improve adhesion somewhat, a layer at least about 0.0002 g/cm² is needed for significant life improvement. The light deposits of this invention are more than adequate to effect whatever postformation, grid-to-paste interface modification occurs, yet well below levels where the aforesaid disadvantages begin to offset the advantages gained.

Tests conducted in connection with this invention included expanded and punched lead-calcium grids as well as wound-wire grids such as disclosed in United States Patent Application Wheadon et al, Ser. No. 70,008, filed Sept. 8, 1970 and assigned to the assignee of the present invention. The wound-wire grids (FIG. 3) have plastic coated 8 glass strands 10 fusion interlocked to the non-antimonial grid wires 4. The test grids were degreased for 20 minutes in 20% potassium hydroxide, rinsed in water, washed in weak hydrochloric acid, rinsed again and placed in the electroplating bath described in Example 1 below. The wound-wire grids had about 13 square inches of surface area and for them the electroplating current was 0.5 amps per grid, which yielded a current density of about 0.04 amps per square inch. Comparable plating rates were used for the other grid shapes. The desired amount of antimony was plated after which the grids were washed and dried. In one test series, the grid was pasted with a 7½% lead sulfate positive paste containing 0.5% of ¼ inch Dynel fibers. In another test series, the grids were pasted using a 10% lead sulfate paste containing 0.25% Dynel fibers. After pasting, the plates were cured by oven-drying for 90 seconds, steaming for 2 hours at 200°F followed by stacking and aging under plastic sheets for 4 days. The thusly prepared positive plates were then assembled into eleven plate cells with six non-antimonial negative plates having an appropriate negative paste formulation. The cells were next formed in 1.050 specific gravity $H_2SO_4$ for 6 hours at 15 amps, 4 hours at rest, 2 hours at 15 amps and 72 hours at 12 amps for a total of 264 amp-hours of charging. The SAE Cold Cranking discharge tests were performed as above, followed by the SAE cycle test.

EXAMPLE I

A non-antimonial grid having a grid area of 140 cm² is immersed in a 3 liter electroplating bath containing 300 grams of dibasic ammonium citrate, 120 grams antimony potassium tartrate and 300 ml. of 50% tetrasodium ethylene diamine tetraacetate (1.3 g/cc density). Using metallic antimony as the anode, the grid is plated for three minutes at one (1) amp to electrochemically deposit 0.00038 g/cm² of antimony on the surface of the grid.

EXAMPLE II

A non-antimonial grid is immersed in a 10% aqueous antimony fluoborate solution at 72°F. The grid is held in the bath for 300 seconds to displace the lead with the antimony and chemically deposit 0.0008 g/cm² of antimony on the surface of the grid.

EXAMPLE III

A non-antimonial grid is placed in a sealed reaction vessel and therein exposed to antimony hydride ($SbH_3$) in a hydrogen carrier gas heated to about 150°C. Exposure continues for a sufficient time to decompose and deposit the desired amount of antimony on the grid. Exposure time will vary with the concentration of the $SbH_3$ in the carrier. Considerable hydrogen excess is recommended to reduce the likelihood of explosion especially at higher temperatures approaching 200°C.

In one test series, using expanded lead-calcium grids containing 0.08% calcium and electroplated according to Example I above, separate grid samples with a 0.00057 g/cm² deposit withstood 285 and 256 SAE cycles.

In another test series, using grids punched from lead-calcium (0.08% Ca) sheet and electroplated according to Example I above, separate grid samples with a 0.00058 g/cm² deposit withstood 325 and 294 SAE cycles.

While this invention has been described solely in terms of certain specific embodiments thereof it is not intended to be limited thereto except to the extent hereinafter set forth in the claims which follow.

We claim:

1. A grid for a Faure-type lead-acid storage battery positive plate comprising a substantially nonantimonial lead alloy substructure having an antimony deposit on its surface, said deposit density being at least about 0.0002 grams per square centimeter but less than about 0.00132 grams per square centimeter of said surface.

2. A grid for a Faure-type lead-acid storage battery positive plate comprising a lead-calcium alloy substructure having an antimony electrodeposit on its surface, said electrodeposit having a density of about 0.00053 to 0.0006 grams per square centimeter of said surface.

* * * * *

UNITED STATES PATENT AND TRADEMARK OFFICE
CERTIFICATE OF CORRECTION

PATENT NO. : 3,933,524
DATED : January 20, 1976
INVENTOR(S) : Thomas J. Hughel, Richard H. Hammar It is certified that error appears in the above-identified patent and that said Letters Patent are hereby corrected as shown below:

In the Specification:

```
Col. 2, line 25 after "very" insert -- thin/ --;
        line 27 after "mony" insert -- coating/ --;
        line 28 insert -- thin coatings/ -- before "light
                deposits";
        line 31 after "antimony" insert -- coatings/ --;
        line 39 after "at" insert -- coatings/ --;
   line 46, after "a", first occurrence, insert -- coating/ --;
        line 47 insert -- coating/ -- before "deposit";
        line 48 after "the" insert -- thicker/ --;
                after "heavier" insert -- coatings/ --;
        line 49 after "the" insert -- thicker/ --;
                after "antimony" insert -- coatings/ --;
        line 50 delete "from" and substitute -- form --;
        line 68 after "antimony" insert -- coatings/ --;
Col. 3, line 13 after "The" insert -- thin coatings/ --;
Col. 4, line 32 after "g/cm$_2^2$" insert -- coating/ --;
        line 37 after "g/cm$^2$" insert -- coating/ --.
```

Signed and Sealed this fifteenth Day of June 1976

[SEAL]

Attest:

RUTH C. MASON
Attesting Officer

C. MARSHALL DANN
Commissioner of Patents and Trademarks